(12) United States Patent
Yeo

(10) Patent No.: US 9,651,987 B2
(45) Date of Patent: May 16, 2017

(54) PORTABLE DISPLAY DEVICE

(71) Applicant: Samsung Display Co., Ltd., Yongin (KR)

(72) Inventor: Gil Hwan Yeo, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/693,439

(22) Filed: Apr. 22, 2015

(65) Prior Publication Data

US 2016/0139629 A1    May 19, 2016

(30) Foreign Application Priority Data

Nov. 17, 2014    (KR) .................. 10-2014-0160088

(51) Int. Cl.
*G06F 1/16* (2006.01)
*H05K 5/00* (2006.01)
*H05K 7/00* (2006.01)

(52) U.S. Cl.
CPC .......... *G06F 1/1624* (2013.01); *G06F 1/1637* (2013.01); *G06F 1/1662* (2013.01)

(58) Field of Classification Search
CPC ........ G06F 1/16; G06F 1/1601–1/1611; G06F 1/1613–1/1698; G06F 1/18–1/189; H05K 5/00–5/069; H05K 7/00–7/186
USPC ............ 361/679.01–679.45, 679.55–679.61, 361/724–727; 335/214, 219, 225, 335/228–230, 234, 250, 262, 274, 275, 335/285, 296, 302–306; 455/575.1–575.9; 349/56–60; 312/223.1–223.3
See application file for complete search history.

(56) References Cited

U.S. PATENT DOCUMENTS

| | | | | |
|---|---|---|---|---|
| 6,297,945 | B1 * | 10/2001 | Yamamoto | G06F 1/1616 312/223.1 |
| 2001/0022719 | A1 * | 9/2001 | Armitage | G06F 1/16 361/679.17 |
| 2002/0145847 | A1 * | 10/2002 | Crosby | F16M 11/10 361/679.02 |

(Continued)

FOREIGN PATENT DOCUMENTS

| | | |
|---|---|---|
| KR | 10-2005-0067864 | 7/2005 |
| KR | 10-0764825 | 10/2007 |

(Continued)

*Primary Examiner* — Anthony Haughton
*Assistant Examiner* — Razmeen Gafur
(74) *Attorney, Agent, or Firm* — H.C. Park & Associates, PLC

(57) ABSTRACT

A portable display device may include a display unit configured to display an image, the display unit including: a first display portion configured to display an image; a second display portion configured to display an image, the second display portion disposed spaced apart from the first display portion; and a connection portion configured to connect to the first display portion and the second display portion to each other; and an input unit configured to slide into and out from the display unit, wherein one of the first display portion and the second display portion is configured to rotate around the connection portion, and the first display portion and the second display portion configured to form an expanded display portion.

19 Claims, 14 Drawing Sheets

(56) References Cited

U.S. PATENT DOCUMENTS

| | | | | |
|---|---|---|---|---|
| 2006/0012951 A1* | 1/2006 | Kim | G06F 1/1641 | 361/679.04 |
| 2006/0152897 A1* | 7/2006 | Hirayama | G06F 1/1656 | 361/679.08 |
| 2007/0167045 A1* | 7/2007 | Park | H04M 1/0225 | 439/142 |
| 2009/0079664 A1* | 3/2009 | Nagai | G02F 1/13336 | 345/1.3 |
| 2009/0256780 A1* | 10/2009 | Small | H04N 1/00127 | 345/55 |
| 2010/0014230 A1* | 1/2010 | Horie | G06F 1/16 | 361/679.01 |
| 2010/0309395 A1* | 12/2010 | Murata | G02B 5/3025 | 348/842 |
| 2011/0019343 A1* | 1/2011 | Zhen | G06F 1/16 | 361/679.01 |
| 2011/0059771 A1* | 3/2011 | Kondo | G06F 1/1616 | 455/556.2 |
| 2011/0126141 A1* | 5/2011 | King | G06F 1/1616 | 715/769 |
| 2011/0285652 A1* | 11/2011 | Imamura | G06F 1/1616 | 345/173 |
| 2011/0310572 A1* | 12/2011 | Murakami | G06F 1/1683 | 361/752 |
| 2012/0147535 A1* | 6/2012 | Ahn | G06F 1/1641 | 361/679.01 |
| 2012/0182295 A1* | 7/2012 | Schilling | G06F 1/1615 | 345/419 |
| 2012/0218690 A1* | 8/2012 | Okutsu | G06F 1/1643 | 361/679.01 |
| 2012/0223872 A1* | 9/2012 | Ram | G06F 1/1601 | 345/1.3 |
| 2013/0083558 A1* | 4/2013 | Becze | G06F 3/1438 | 362/611 |
| 2013/0187833 A1* | 7/2013 | Kim | G06F 1/1641 | 345/1.3 |
| 2013/0201621 A1* | 8/2013 | Song | H05K 7/16 | 361/679.27 |
| 2013/0250506 A1* | 9/2013 | Fujiwara | G06F 1/16 | 361/679.31 |
| 2013/0250509 A1* | 9/2013 | Tachikawa | G06F 1/1656 | 361/679.55 |
| 2013/0286562 A1* | 10/2013 | Nakajima | H05K 5/0017 | 361/679.01 |
| 2013/0329351 A1* | 12/2013 | Lin | H05K 5/0239 | 361/679.27 |
| 2014/0029190 A1* | 1/2014 | Sato | G06F 1/1641 | 361/679.27 |
| 2014/0063717 A1* | 3/2014 | Tseng | G06F 1/16 | 361/679.21 |
| 2014/0104765 A1* | 4/2014 | Hoshino | G06F 1/1681 | 361/679.01 |
| 2014/0125553 A1* | 5/2014 | Kim | G06F 1/1616 | 345/1.3 |

FOREIGN PATENT DOCUMENTS

| | | |
|---|---|---|
| KR | 10-2008-0035709 | 4/2008 |
| KR | 10-2012-0014689 | 2/2012 |
| KR | 10-2012-0124194 | 11/2012 |
| KR | 10-2013-0062210 | 6/2013 |
| KR | 10-2013-0081617 | 7/2013 |
| KR | 10-1294954 | 8/2013 |
| KR | 10-2013-0118979 | 10/2013 |

* cited by examiner

PORTABLE DISPLAY DEVICE

CROSS REFERENCE TO RELATED APPLICATION

This application claims priority from and the benefit of Korean Patent Application No. 10-2014-0160088, filed on Nov. 17, 2014, which is hereby incorporated by reference for all purposes as if fully set forth herein.

BACKGROUND

Field

Exemplary embodiments relate to a portable display device.

Discussion of the Background

Flat display panels may be light weight, thin, and driven with low power, with a wide range of applications. Accordingly, such flat display panels may be adopted in portable computers, cellular phones, and audio/video appliances.

In connection with the development of IT technology, flat display panels may also be used in portable display devices, such as a cellular phone, a smart phone, or a tablet PC, which can use wireless services, such as broadcasting and communications, even while mobile rather than in a fixed position.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a portable display device with improved portability including an extendable display unit.

Additional aspects will be set forth in the detailed description which follows, and, in part, will be apparent from the disclosure, or may be learned by practice of the inventive concept.

According to one or more exemplary embodiments, a portable display device may include a display unit configured to display an image, the display unit including: a first display portion configured to display an image; a second display portion configured to display an image, the second display portion disposed spaced apart from the first display portion; and a connection portion configured to connect to the first display portion and the second display portion to each other; and an input unit configured to slide into and out from the display unit, wherein one of the first display portion and the second display portion is configured to rotate around the connection portion, and the first display portion and the second display portion configured to form an expanded display portion.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
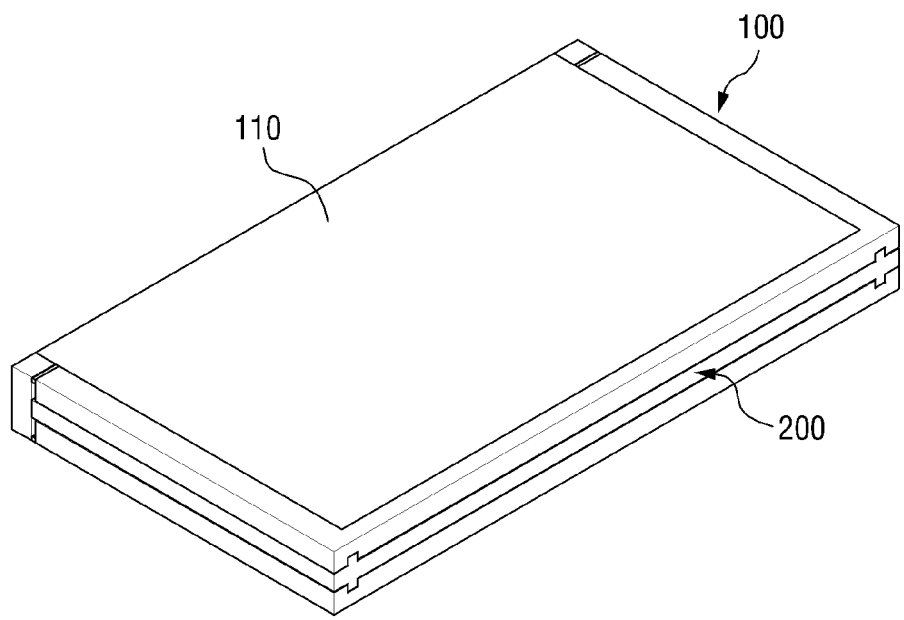
FIG. 1 is a perspective view of a portable display device in a combined state according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to plan and/or sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, embodiments of the present invention will be described with reference to the drawings.

Figure 2:
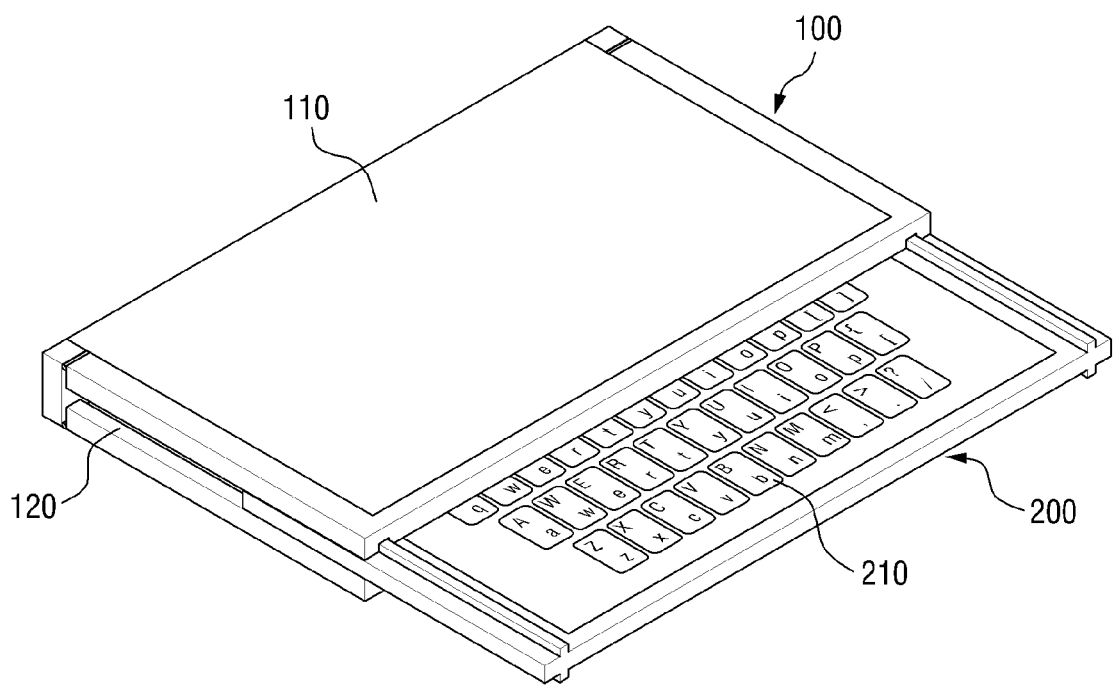
FIG. 2 is a perspective view of a portable display device in a separated state according to one or more exemplary embodiments.
Figure 3:
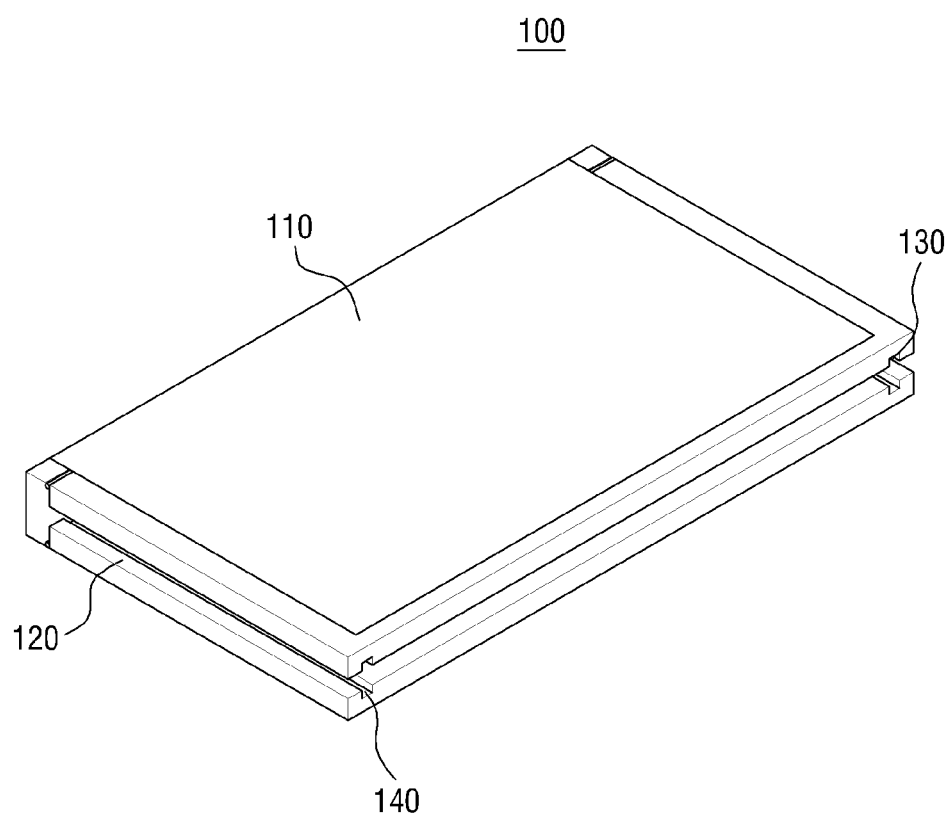
FIG. 3 is a perspective view of a display unit illustrated in FIG. 1 according to one or more exemplary embodiments.
Figure 4:
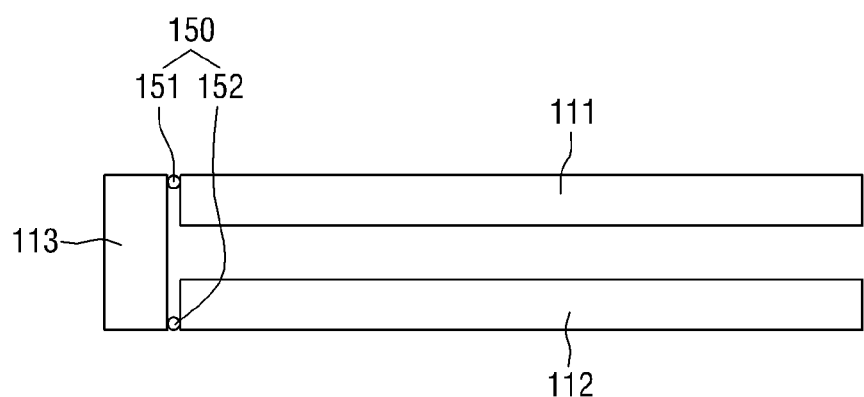
FIG. 4 is a side view of a display unit illustrated in FIG. 1 according to one or more exemplary embodiments.
Figure 5:
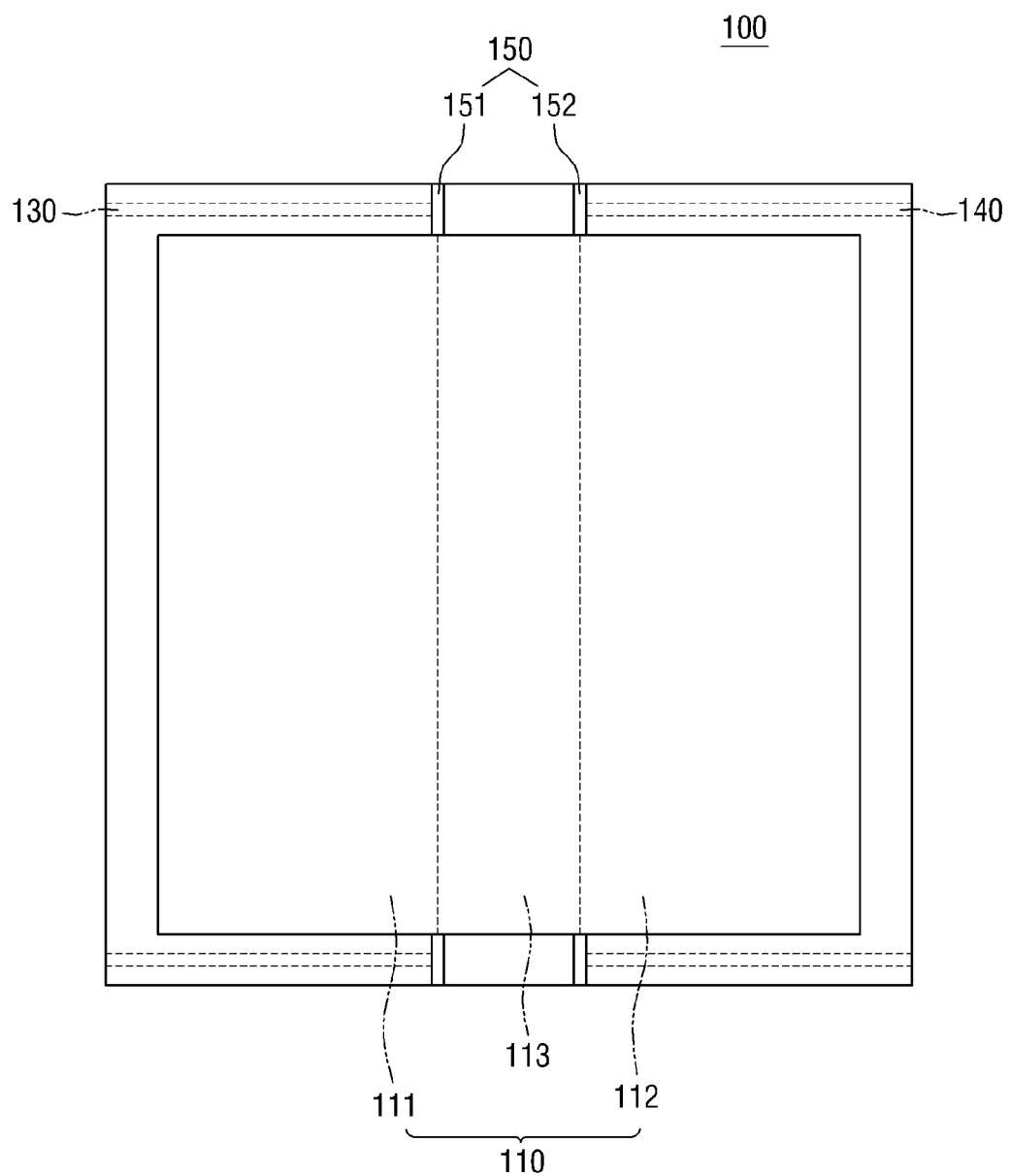
FIG. 5 is a plan view of a display unit illustrated in FIG. 1 in an unfolded state according to one or more exemplary embodiments.

FIG. 1 is a perspective view of a portable display device in a combined state according to one or more exemplary embodiments, and FIG. 2 is a perspective view of a portable display device in a separated state according to one or more exemplary embodiments. FIG. 3 is a perspective view of a display unit illustrated in FIG. 1 according to one or more exemplary embodiments, and FIG. 4 is a side view of a display unit illustrated in FIG. 1 according to one or more exemplary embodiments. FIG. 5 is a plan view of a display unit of FIG. 1 in an unfolded state according to one or more exemplary embodiments.

Referring to FIGS. 1 and 2, a portable display device according to one or more exemplary embodiments may include a display unit 100 and an input unit 200. The portable display may be in the combined state by sliding the input unit 200 into the display unit 100, and the portable display unit may be in the separated state by sliding the input unit 200 out from the display unit 100.

Referring to FIG. 3, the display unit 100 may include a display portion 110 and a storage space 120. Referring to FIG. 4, the display portion 110 may include a first display portion 111, a second display portion 112, and a connection portion 113. The first display portion 111 and the second display portion 112 are rotatably connected to the connection portion 113.

The first display portion 111 and the second display portion 112 may include an Liquid Crystal Display (LCD) panel, an electrophoretic display panel, an Organic Light Emitting Diode (OLED) panel, an Light Emitting Diode (LED) panel, an inorganic Electro Luminescent (EL) display panel, a Field Emission Display (FED) panel, a Surface-conduction Electron-emitter Display (SED) panel, a Plasma Display Panel (PDP), and/or a Cathode Ray Tube (CRT) display panel.

The first display portion 111 and the second display portion 112 may be arranged in opposite positions with respect to the connection portion 113.

For example, referring back to FIGS. 3 and 4, the display unit 100 in a folded state may include the first display portion 111 connected to an upper side of the connection portion 113, and the second display portion 112 connected to a lower side of the connection portion 113.

The first display portion 111 and the second display portion 112 may be connected to one side of the connection portion 113, and may be disposed spaced apart from each other. That is, a determined space may be provided between the first display portion 111 and the second display portion 112, and the determined space may be used as the storage space 120 in which the input unit 200 may be stored.

Referring to FIG. 5, the display unit 100 may be in an unfolded state by disposing the first display portion 111 on one side of the connection portion 113 and the second display portion 112 on the other side of the connection portion 113.

The first display portion 111 and the second display portion 112 may include an active region where an image is displayed, and an inactive region where an image is not displayed. The active regions of the first and second display portions 111 and 112 may disposed on the same surface in the case where the display unit is in an unfolded state. For example, the active region may be disposed in a center region of the display unit 100, and the inactive region may be disposed in an edge region of the display unit 100. The inactive region may include a power supply (not illustrated) for turning on/off the display unit 100 and a speaker (not illustrated).

The connection portion 113 may connect the first and second display portions 111 and 112, and the first and second display portions 111 and 112 may be rotatable with respect to the connection portion 113. The connection portion 113 may include a hinge 150. The hinge 150 may include a first hinge 151 rotatably connecting the first display portion 111 to the connection portion 113, and a second hinge 152 rotatably connecting the second display portion 112 to the connection portion 113.

The display unit 100 may be folded or unfolded by the hinge 150, and the display unit 100 in unfolded state may include the display portion 110 extended to form a large-sized screen. The extended display portion 110 may include a third display portion disposed on the connection portion 113 connecting the first display portion 111 and the second display portion 112 to each other.

The first display portion 111, the second display portion 112, and the connection portion 113, which are connected by the hinge 150, may be independently separated. When independently separated, the first display portion 111, the second display portion 112, and the connection portion 113 may independently display images.

When the portable display is in the combined state, each of the first display portion 111, the second display portion 112, and the connection portion 113 may be independently selected to display an image. The display unit 100 may include sub-driving controller (not illustrated) configured to drive the respective display portions when the respective display portions are separated from each other, and may further include a main driving controller (not illustrated) configured to control the operation of the display unit 100 when the portable display is in the combined state and when the display unit 100 is extended to the large-sized screen.

The display unit 100 may include rail grooves 130 and 140 (see FIGS. 3 and 5) configured to guide the input unit 200 to slide into the storage space 120. The input unit 200 may be slid along the rail grooves 130 and 140 into and out from the display unit 100. The rail grooves 130 and 140 may be disposed on a surface opposite to the active region of the first display portion 111 and a surface opposite to the active region of the second display portion 112, respectively. For example, the rail grooves 130 and 140 may be disposed on the surfaces disposed on each of the first and second display portions 111 and 112 facing the other display portion when folded.

A display unit 300 according to one or more exemplary embodiments will be described with reference to FIGS. 6 and 7.

Figure 6:
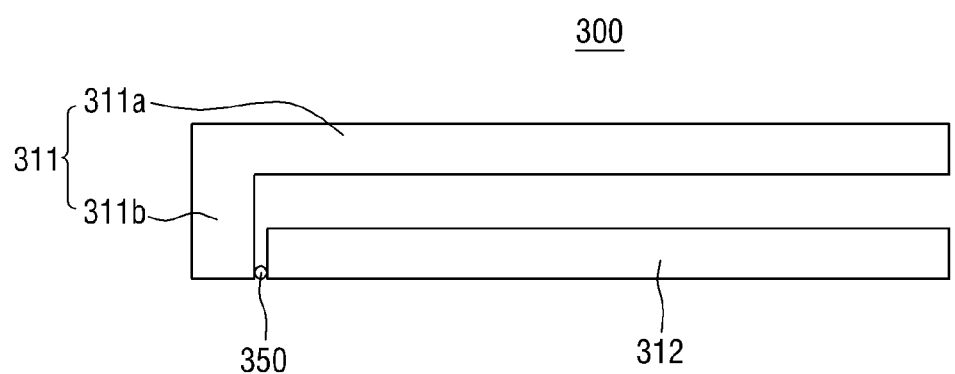
FIG. 6 is a side view of a display unit illustrated in FIG. 1 according to one or more exemplary embodiments.
Figure 7:
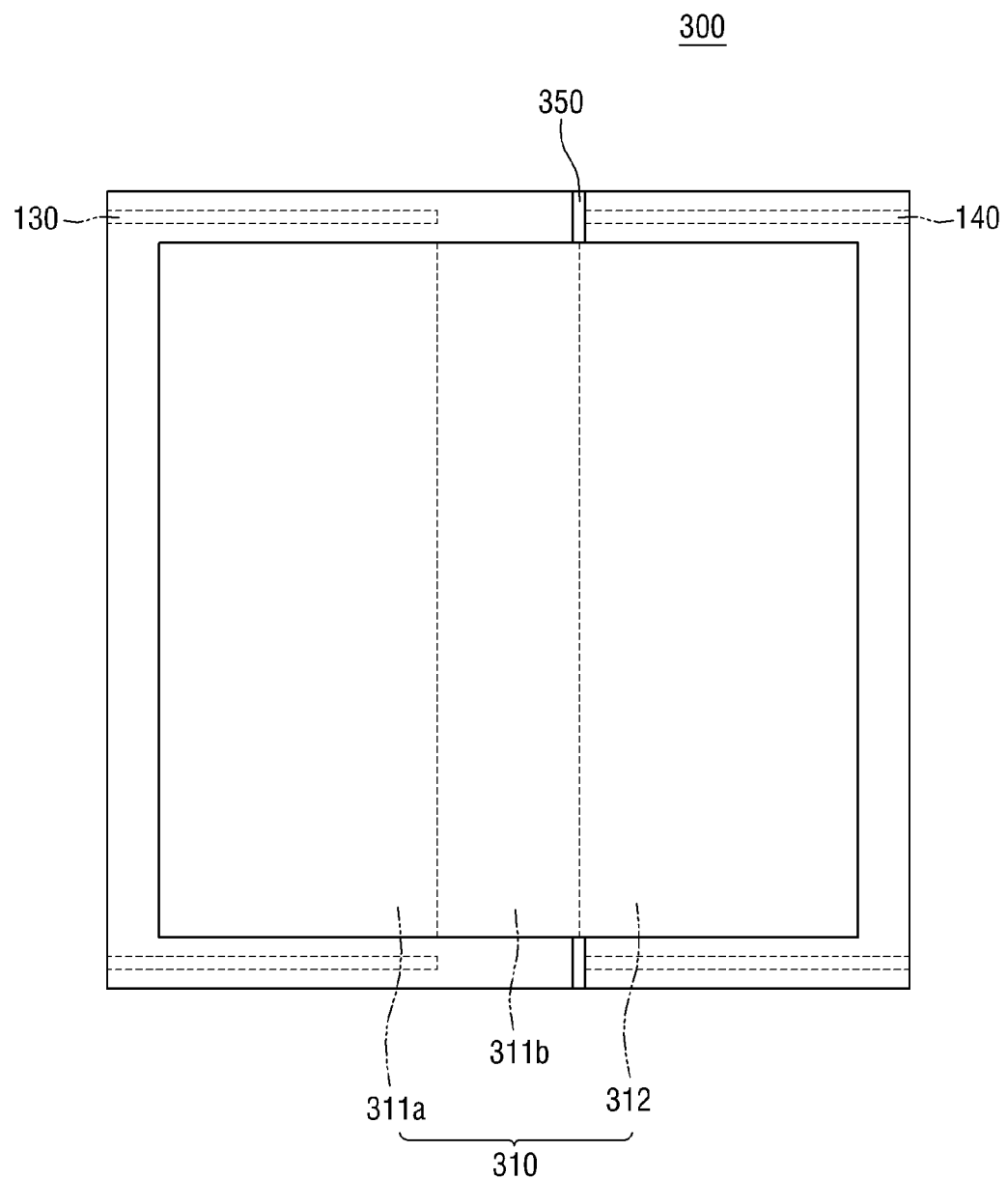
FIG. 7 is a plan view of a display unit illustrated in FIG. 1 in an unfolded state according to one or more exemplary embodiments

FIG. 6 is a side view of a display unit 300 according to one or more exemplary embodiments, and FIG. 7 is a plan view of a display unit 300 in an unfolded state according to one or more exemplary embodiments.

Referring to FIG. 6, a display portion 310 of the display unit 300 according to one or more exemplary embodiments may include a first display portion 311 and a second display portion 312. The first display portion 311 may include a flexible material and thus, the first display portion 311 may be bendable. As illustrated in FIGS. 6 and 7, the first display portion 311 and the second display portion 312 may be rotatably connected to each other by a hinge 350. The hinge 350 may be disposed on a region where the first display portion 311 and the second display portion 312 are connected to each other.

The first display portion 311 may include a planar display portion 311a and a bendable display portion 311b. The planar display portion 311a may include a rigid material, and the bendable display portion 311b may include a flexible material and/or may be disposed on a plastic film having flexibility. The second display portion 312 may include the same material as the planar display portion 311a.

A display unit according to still one or more exemplary embodiments will be described with reference to FIGS. 8 and 9.

Figure 8:
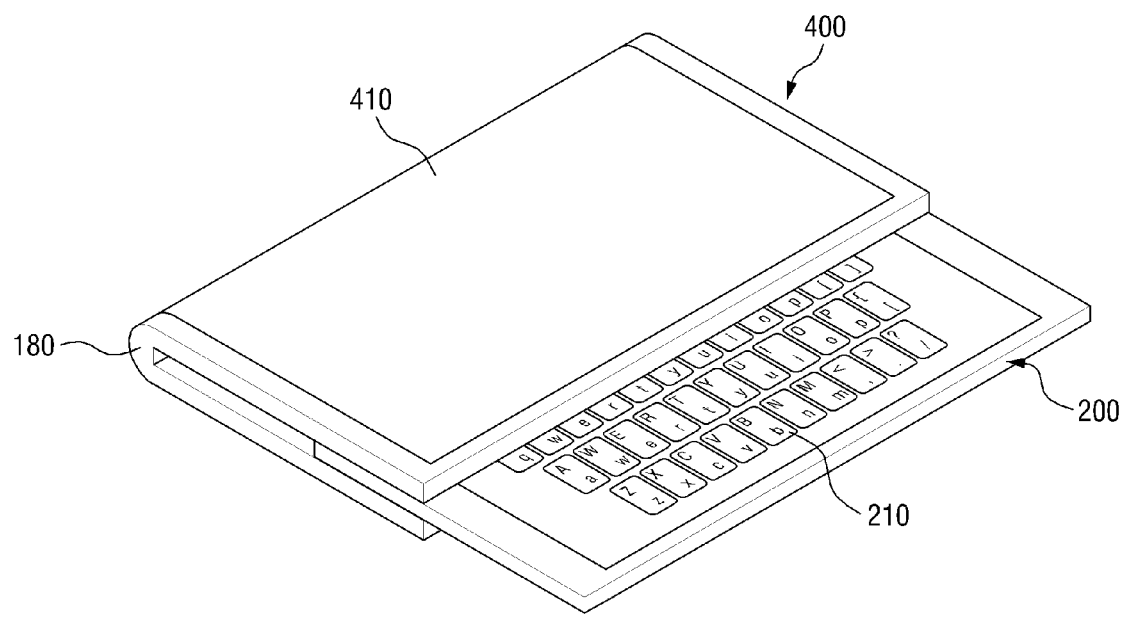
FIG. 8 is a perspective view of a portable display device in a combined state according to one or more exemplary embodiments.

FIG. 8 is a perspective view of a portable display device in a combined state according to one or more exemplary embodiments.

Referring to FIG. 8, a display unit 400 of a portable display device 400 according to one or more exemplary embodiments may include a display panel including a flexible substrate. In order to decrease damage to the display unit 400 from the folding and unfolding process, the display unit 400 may include a bent portion 180 including a slowly curved surface. When the display unit 400 including the bent portion 180 is unfolded, the bent portion 180 may be unfolded to extend the display unit 400 without any boundary portion.

An input unit 200 disposed in a storage space 120 of the display unit 400 will be described in more detail.

Figure 9:
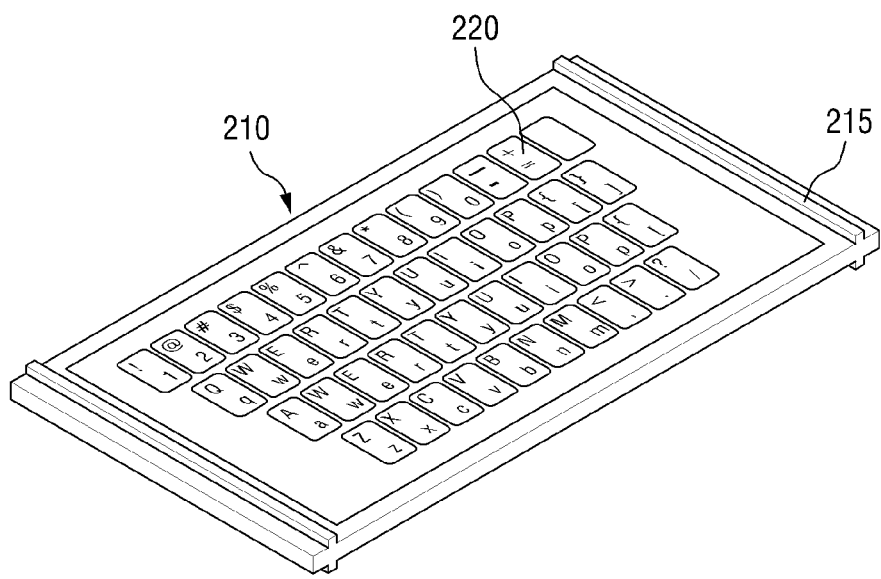
FIG. 9 is a perspective view of an input unit according to one or more exemplary embodiments.
Figure 10:
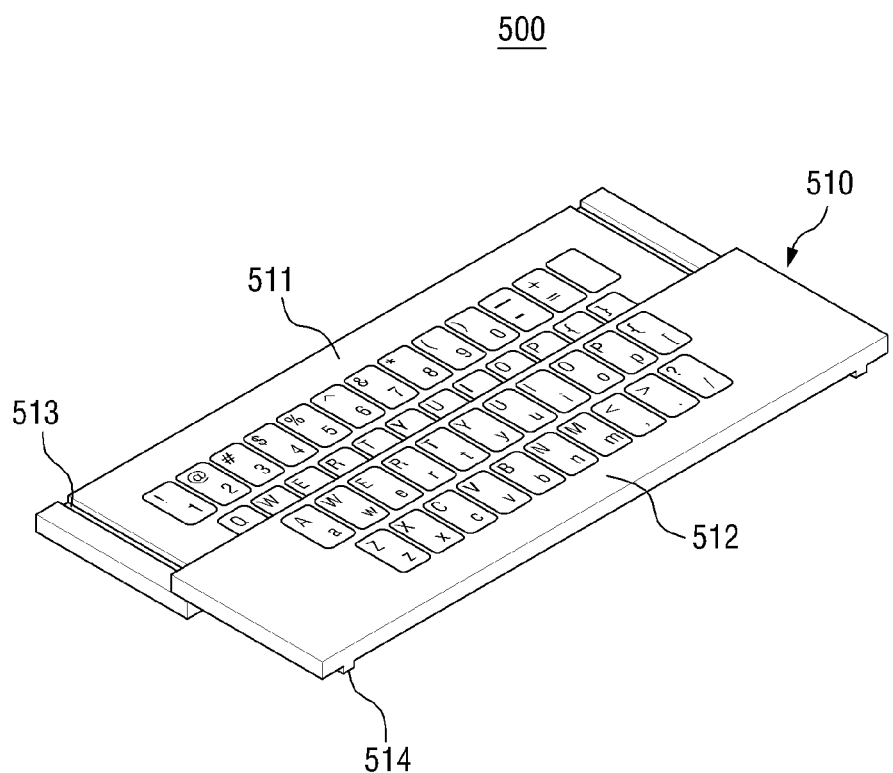
FIG. 10 is a perspective view of an input unit according to one or more exemplary embodiments.
Figure 11:
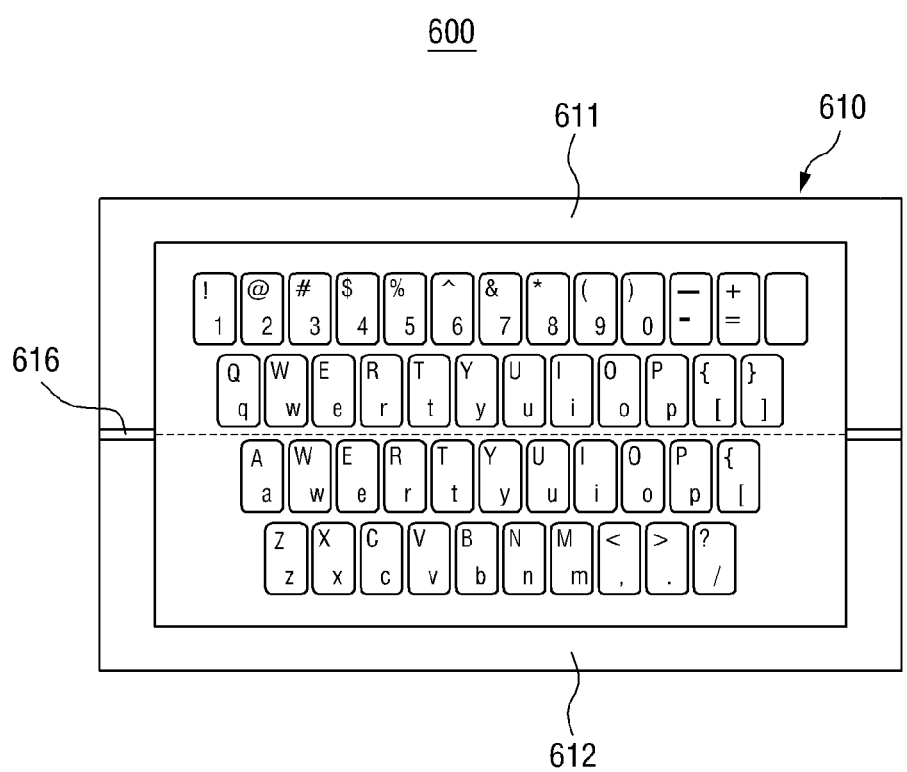
FIG. 11 is a plan view of an input unit according to one or more exemplary embodiments.

FIG. 9 is a perspective view of an input unit 200 according to one or more exemplary embodiments. FIG. 10 is a perspective view of an input unit 500 according to one or more exemplary embodiments, and FIG. 11 is a plan view of an input unit 600 according to one or more exemplary embodiments.

Referring to FIG. 9, the input unit 200 may include a body portion 210 configured to slide into the storage space 120 of the display unit 100/300/400, and an input portion 220 may be disposed on the body portion 210.

The body portion 210 may include guide rails 215 that correspond to rail grooves 130 and 140 of the display unit 100, and the input unit 200 may be configured to slide into and out of the storage space 120 of the display unit 100/300/400. For example, the guide rails 215 may be disposed on both sides of the body portion 210 protruding from an upper surface and lower surface thereof in the length direction of the body portion 210. The body portion 210 may further include a power supply (not illustrated) configured to turn on/off the input unit 200.

The input portion 220 may be disposed on one surface of the body portion 210. For example, the input portion 220 may be a keyboard configured to receive input with a dedicated electronic pen or a fingertip.

The size of the input unit 200 may correspond to the size of the display unit 100. In particular, if the display unit 100 has a small size, the input unit 200 should have a small size so that the input unit 200 may be stored in the display unit 100.

The input unit 200 having a small size may be folded or unfolded. Referring to FIG. 10, the input unit 500 may include a body portion 510 including two or more layers configured to slide and extend. For example, the input unit 500 formed in a sliding manner may include a rail groove 513 on an upper surface of the first layer 511, and a guide rail 514 disposed on a bottom surface of the second layer 512 corresponding to the rail groove 513 of the first layer 511. The body portion 510 may further include a guide rail (not illustrated) configured to slide the body portion 510 into and out from the storage space 120 of the display unit 100.

Referring to FIG. 11, an input unit 600 may have a body 610 configured to fold or unfold by a hinge 616.

According to the portable display device according to one or more exemplary embodiments, the display unit 100/300/400 and the input unit 200 may respectively include the rail grooves 130 and 140 and the guide rails 215 and the input unit 200/500/600 may be configured to slide into and out from the display unit 100/300/400. However, the exemplary embodiments are not limited thereto, and the display unit 100/300/400 and the input unit 200/500/600 may include a hook and/or a spring.

Figure 12:
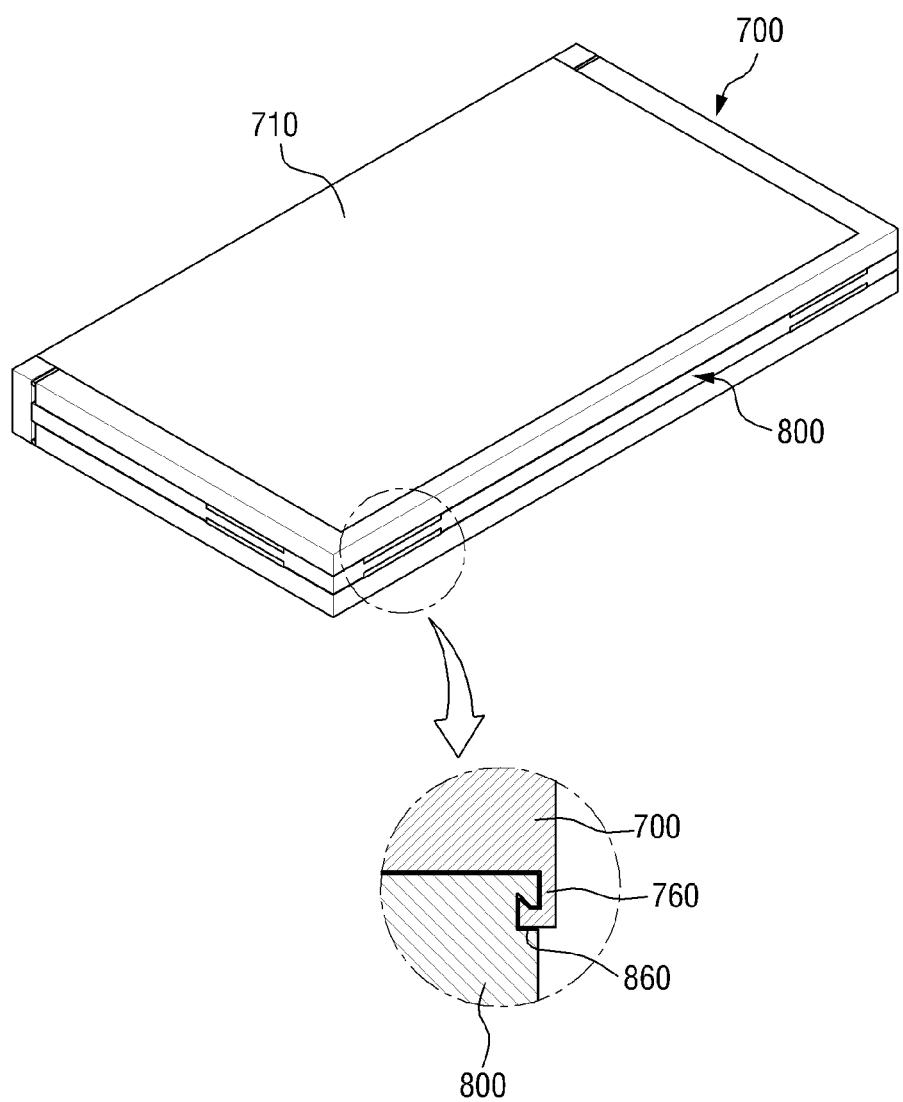
FIG. 12 is a perspective view of a portable display device in a combined state according to one or more exemplary embodiments.
Figure 13:
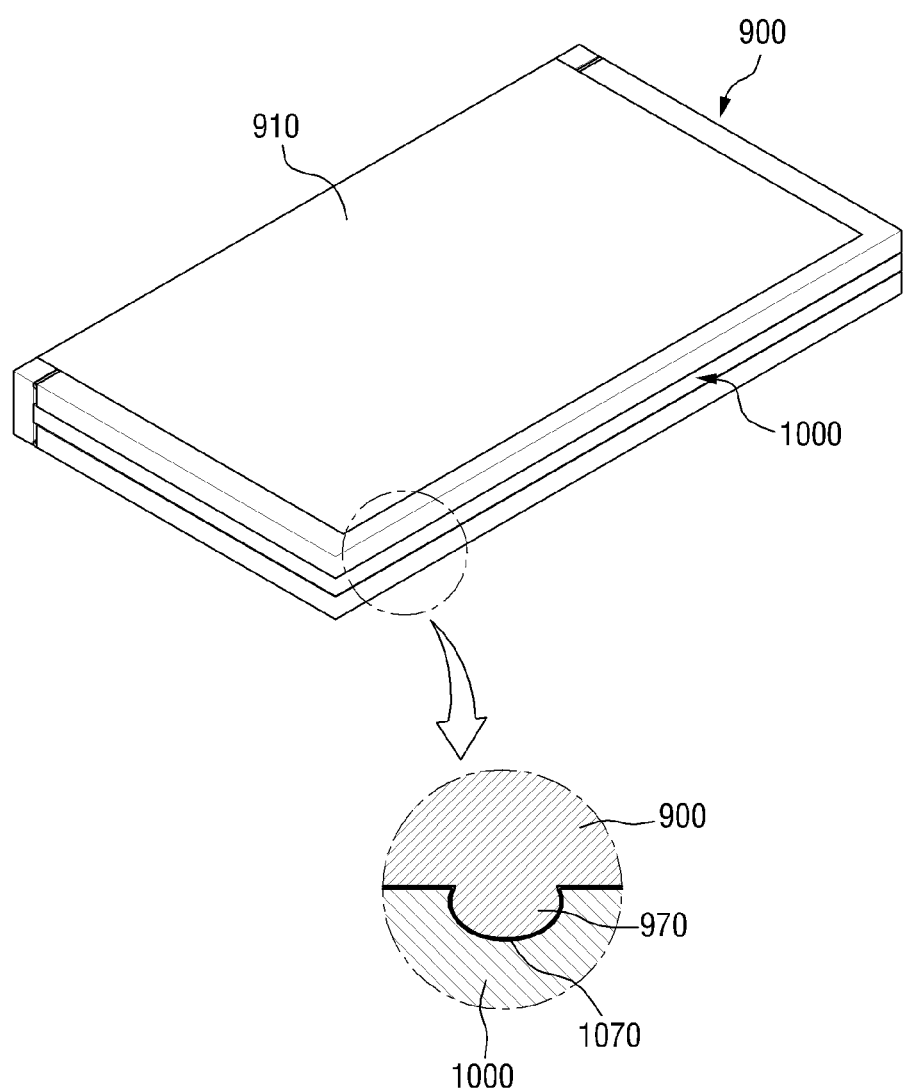
FIG. 13 is a perspective view of a portable display device in a combined state according to one or more exemplary embodiments.
Figure 14:
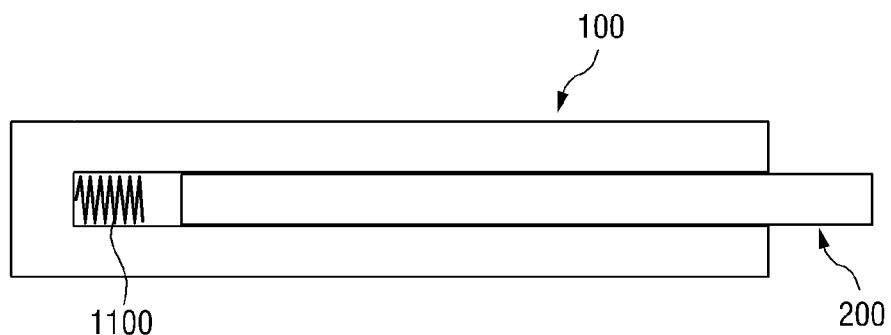
FIG. 14 is a side view of a portable display device in a combined state according to one or more exemplary embodiments.

FIG. 12 is a perspective view of a portable display device in a combined state according to one or more exemplary embodiments. FIG. 13 is a perspective view of a portable display device in a combined state according to one or more exemplary embodiments, and FIG. 14 is a side view of a portable display device in a combined state according to one or more exemplary embodiments.

Referring to FIG. 12, a portable display device according to one or more exemplary embodiments may include a hook portion 760 disposed on a side surface of a display portion 710 of the display unit 700, more specifically, on a side surface of a first display portion 711, and a hook groove 860 disposed on a body portion 810 of an input unit 800 corresponding to the hook portion 760.

The hook portion 760 of the display unit 700 may protrude from a side surface of the display portion 710 of the display unit 700 toward the storage space 120 and may be configured to affix the input unit 200 by fastening the hook portion 760 with the hook groove 860. Two or more hook portions 760 may be disposed on the display unit 700.

The hook groove 860 of the input unit 800 may be disposed corresponding to the hook portion 760 configured to be fastened to the hook portion 760.

An embodiment of the portable display illustrated in FIG. 12 comprising the display unit 700 and the input unit 800, and including the hook portion 760 and the hook groove 860, respectively, may further include an elastic portion 1100 (refer to FIG. 14) having an elastic structure, like a spring, on an inner surface of the storage space 120. The elastic portion 1100 may be configured to aid the input unit 800 from sliding into or out from the display unit 700. According to the one or more exemplary embodiments, the elastic portion 1100 is provided on the inner surface of the storage space 120 of the display unit 700, but is not limited thereto. The elastic portion 1100 may also be disposed on a storage surface of the input unit 800.

Referring to FIG. 13, a portable display device according to one or more exemplary embodiments may respectively include a convex portion 970 on a display unit 900 and a corresponding concave portion 1070 on an input unit 1000.

The display unit 900 may include a plurality of convex portions 170 disposed on a surface opposite to an upper surface configured to display an image.

The input unit 1000 may include a plurality of concave portions 1070 disposed corresponding to the convex portions 970 disposed on the display unit 900.

The portable display illustrated in FIG. 13 including the display unit 900 and the input unit 1000 including the convex portions 970 and the concave portion 1070, respectively, may further include an elastic portion 1100 (refer to FIG. 14) including an elastic structure, like a spring, on an inner surface of the storage space 120. The elastic portion 1100 may be configured to aid the input unit 800 from sliding into or out from the display unit 700. FIG. 13 illustrates that the convex portion 970 is disposed on the display unit 900 and the concave portion 1070 is disposed on the input unit 1000, but the exemplary embodiments are not limited thereto. The concave portion may be provided on the display unit 900, and the convex portion may be provided on the input unit 1000.

Further, FIG. 13 illustrates that a sectional shape of the convex and concave portions 970 and 1070 are semi-circular, but the exemplary embodiments are not limited thereto. The sectional shape of convex and concave portions may be in the shape of a trapezoid, a rectangle, or any other suitable shape.

The portable display device according to one or more exemplary embodiments may further include a wire and/or wireless communication unit (not illustrated), and the controller (not illustrated) of the display unit may be electrically connected to the controller (not illustrated) of the input unit. The portable display device according to one or more exemplary embodiments, the display portion may display a mail and/or an image received through a public Internet, and information input through the input portion of the input unit, such as a keyboard, may be displayed on the display portion.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A portable display device comprising:
    a display unit configured to display an image, the display unit comprising:
        a first display portion configured to display an image;
        a second display portion configured to display an image, the second display portion disposed spaced apart from the first display portion; and
        a connection portion configured to connect to the first display portion and the second display portion to each other;
    an input unit configured to slide into and out from the display unit; and
    a storing region configured to store the input unit,
    wherein the storing region is disposed between the first display portion and the second display portion,
    wherein one of the first display portion and the second display portion is configured to rotate around the connection portion, and the first display portion and the second display portion configured to form an expanded display portion.

2. The portable display device of claim 1, wherein the connection portion comprises a third display portion configured to display an image.

3. The portable display device of claim 1, further comprising a guide member disposed on any one of the input unit and the first display portion and the second display portion, the guide member configured to limit a movement of the input unit in at least one direction, and to guide the movement of the input unit in another direction so that the input unit may slide out in the another direction.

4. The portable display device of claim 3, wherein the guide member comprises:
    a rail groove disposed on a lower surface opposite to an upper surface of one of the first display portion and the second display portion, the upper surface configured to display an image; and a guide rail disposed on the input unit corresponding to the rail groove.

5. The portable display device of claim 3, wherein the guide member comprises:
a hook portion disposed on a side surface of one of the first display portion and the second display portion; and
a hook groove disposed on a side surface of the input unit corresponding to the hook portion, the hook grove configured to be fastened with the hook portion.

6. The portable display device of claim 3, wherein the guide member comprises:
a plurality of concave portions disposed on a side surface of one of the first display portion and the second display portion; and
a plurality of convex portions disposed on a side surface of the input unit corresponding to the plurality of concave portions, the plurality of convex portions configured to be fastened with the plurality of concave portions.

7. The portable display device of claim 4, wherein the input unit comprises:
a body portion comprising the guide member; and
an input portion disposed on one surface of the body portion.

8. The portable display device of claim 1, wherein the storing region comprises an elastic portion disposed on an inner side surface thereof.

9. The portable display device of claim 1, wherein the input unit comprises an elastic portion disposed on a storing surface of the input unit.

10. The portable display device of claim 1, further comprising a hinge configured to rotatably connect the first display portion, the second display portion, and the connection portion from each other.

11. The portable display device of claim 1, wherein the first display portion, the second display portion, and the connection portion are configured to independently display images.

12. The portable display device of claim 1, wherein the first display portion and the connection portion are integrally formed, and
the connection portion comprises a flexible material.

13. The portable display device of claim 12, further comprising a hinge configured to rotatably connect the connection portion and the second display portion to each other.

14. The portable display device of claim 1, wherein the first display portion, the second display portion, and the connection portion are integrally formed.

15. The portable display device of claim 14, wherein the first display portion, the second display portion, and the connection portion include a flexible material.

16. The portable display device of claim 14, wherein the extension member comprises a hinge.

17. The portable display device of claim 1, wherein the input unit comprises a plurality of layers,
wherein the plurality of layers comprises an extension member disposed on each of the plurality of layers,
wherein the plurality of layers are configured to extend along the extension member.

18. The portable display device of claim 17, wherein the extension member comprises a rail groove and a guide rail.

19. The portable display device of claim 1, wherein the display unit and the input unit are configured to display image transmitted from wire or wireless communications.

* * * * *